(12) United States Patent
Wilkes et al.

(10) Patent No.: US 6,914,406 B1
(45) Date of Patent: Jul. 5, 2005

(54) ELECTRIC ACTUATOR TO PRODUCE A PREDETERMINED FORCE

(75) Inventors: Kenneth R. Wilkes, Asheville, NC (US); S. Clark Beard, Asheville, NC (US)

(73) Assignee: River Solutions, Inc., Asheville, NC (US)

( * ) Notice: Subject to any disclaimer, the term of this patent is extended or adjusted under 35 U.S.C. 154(b) by 395 days.

(21) Appl. No.: 10/065,933

(22) Filed: Dec. 2, 2002

(51) Int. Cl.[7] ............................................. G05B 19/40
(52) U.S. Cl. ........................ 318/685; 318/566; 318/626
(58) Field of Search .................................. 318/685, 566, 318/626, 646, 677, 568.25, 576, 578

(56) References Cited

U.S. PATENT DOCUMENTS 6,452,354 B1   9/2002   Ellsworth et al.

2002/0106242 A1 * 8/2002 Rahn et al. .................. 404/96

* cited by examiner

Primary Examiner—Karen Masih
(74) Attorney, Agent, or Firm—Blakely, Sokoloff, Taylor & Zafman LLP

(57) ABSTRACT

An electric actuator Includes a first plate and a substantially parallel second plate. A linkage system couples the first plate to the second plate such that moving the linkage system toward an over-center position causes the second plate to move away from the first plate. An electric motor is coupled to the linkage system to move the linkage system toward the over-center position. A force transducer is coupled to the actuator to produce a force signal responsive to a force produced by the actuator. A control system is coupled to the electric motor and the force transducer to provide a control signal to the electric motor to move the linkage system to a position that was determined by the control system in response to the force signal in a previous movement of the linkage system.

32 Claims, 7 Drawing Sheets

US 6,914,406 B1

ELECTRIC ACTUATOR TO PRODUCE A PREDETERMINED FORCE

BACKGROUND OF INVENTION

The invention relates to linear actuators. In particular, the invention relates to an electrical actuator that provides a linear motion and produces a predetermined force at the end of the outward extension of the actuator.

Linear actuators are used to move machine parts along a straight path. For example, a linear actuator may be used to move a first plate toward a fixed second plate to produce a pressing or clamping action. It may be desirable for the actuator to advance and produce a predetermined force.

For example, fabrication of articles of manufacture from plastic films, such as bags and pouches, generally requires the welding together of two or more plastic films or sheets to form seams or closures. Plastic films may also be heat sealed to unlike materials such as paperboard or metal foils. Heat sealing or welding may be accomplished by pressing a heated die or seaming iron with the pattern of the required seams or closures against the plastic films or sheets with a suitable pressure for a suitable length of time.

A pouch making machine as disclosed in U.S. Pat. No. 5,800,325 is an example of fabrication that employs a heat sealing die. FIG. 1 is a schematic side view of an exemplary pouch making machine. The pouches fabricated by the machine of FIG. 1 start out as two webs of pouch material 11, 12. These two webs are joined by being seamed together to form a single web 26 in a heat seal station 10. A seaming iron 18 used to create the perimeter seams on the pouches may simultaneously form the seams for a number of pouches along the length of the web 26. The seaming iron 18 may be any number of pouches wide, as is economical under the circumstances.

Two webs of sheet stock 11, 12 are fed into the pouch making machine from two rolls 13 and 14. The webs 11, 12 are drawn into the machine by rollers 15, 16. One or both of these rollers are driven by a motor 17. The motion is intermittent in that the webs are drawn rapidly into the machine for a period of time, and then the motion stops for some other period of time to allow the perimeter seams of the pouches to be made by the hot seaming iron 18 being pressed against a platen 19. The seaming iron 18 is pressed against the platen 19 by one or more actuators 22 under the control of a control system 21 The control system 21 may use a signal from a sensor 20 to determine the position or speed of the web 26. A typical duration for the seaming process and subsequent cooling is about two seconds.

As the rollers 15, 16 are drawing the webs 11, 12 under the seaming iron 18, the web section 26 on which pouch seams have previously been formed is passed into an accumulator portion of the machine. The accumulator is the portion of the machine between rollers 15/16 and roller 23. A dancer roller 24 moves up and down to accommodate the web being fed in. The seamed web is then fed into subsequent processing stations such as a slitter and transverse cutter 30.

Three conditions involved in creating a seal are temperature, pressure, and time. At a constant temperature of the heat seal die, a reduction in pressure requires a corresponding increase in time to maintain the quality of the seal. Thus it is important that the actuator 22 accurately produces the correct pressure in each heat sealing cycle with a low cycle to cycle variation. The length of time the heat seal die 18 is held against the plastic films 11, 12 has to be long enough to produce a quality weld for the lowest pressure that may be applied. Excessive cycle to cycle variation in heat seal pressure requires that the sealing time be increased accordingly. This reduces the throughput of the heat sealing station 10.

Prior art heat sealing stations have used hydraulic or pneumatic actuators to apply pressure to the heat seal die. Hydraulic or pneumatic actuators produce a predetermined force that is related to the supply pressure of the actuating fluid. However, the use of hydraulic or pneumatic actuators requires that a source of pressurized actuating fluid be available. It would be desirable to provide an actuator to advance and produce a predetermined force without the need for a source of pressurized actuating fluid.

SUMMARY OF INVENTION

An electric actuator includes a first plate and a substantially parallel second plate. A linkage system couples the first plate to the second plate such that moving the linkage system toward an over-center position causes the second plate to move away from the first plate. An electric motor is coupled to the linkage system to move the linkage system toward the over-center position. A force transducer is coupled to the actuator to produce a force signal responsive to a force produced by the actuator. A control system is coupled to the electric motor and the force transducer to provide a control signal to the electric motor to move the linkage system to a position that is determined by the control system in response to the force signal in a previous movement of the linkage system.

DETAILED DESCRIPTION

Figure 2A:
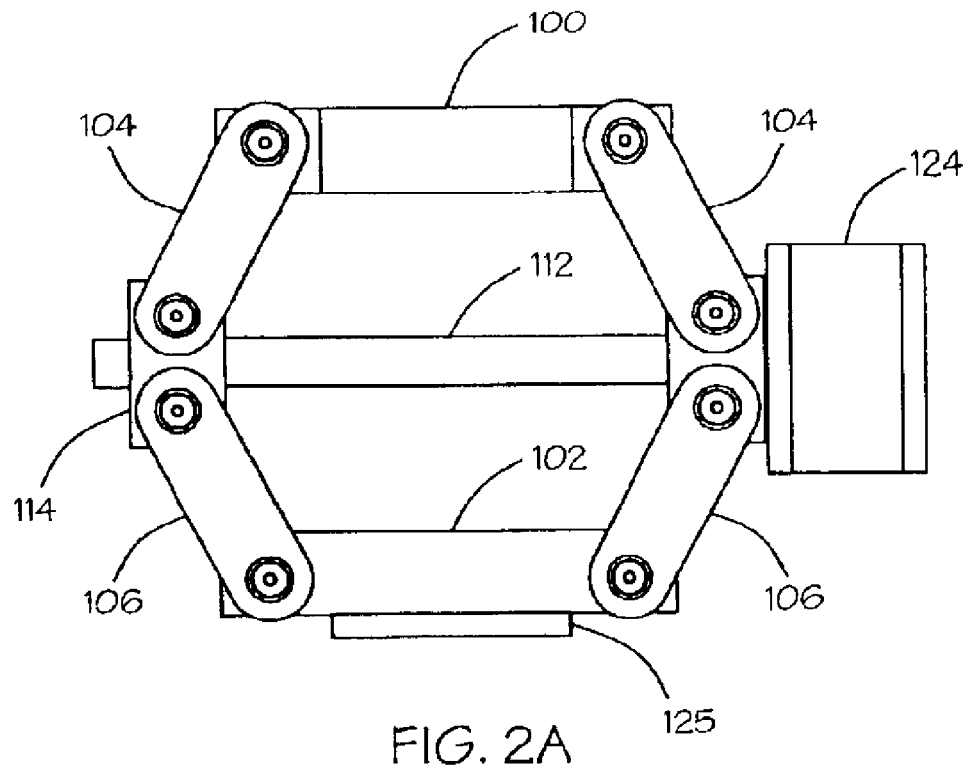
FIGS. 2A and 2B are side elevations of an embodiment of an electric actuator in two positions.
Figure 2B:
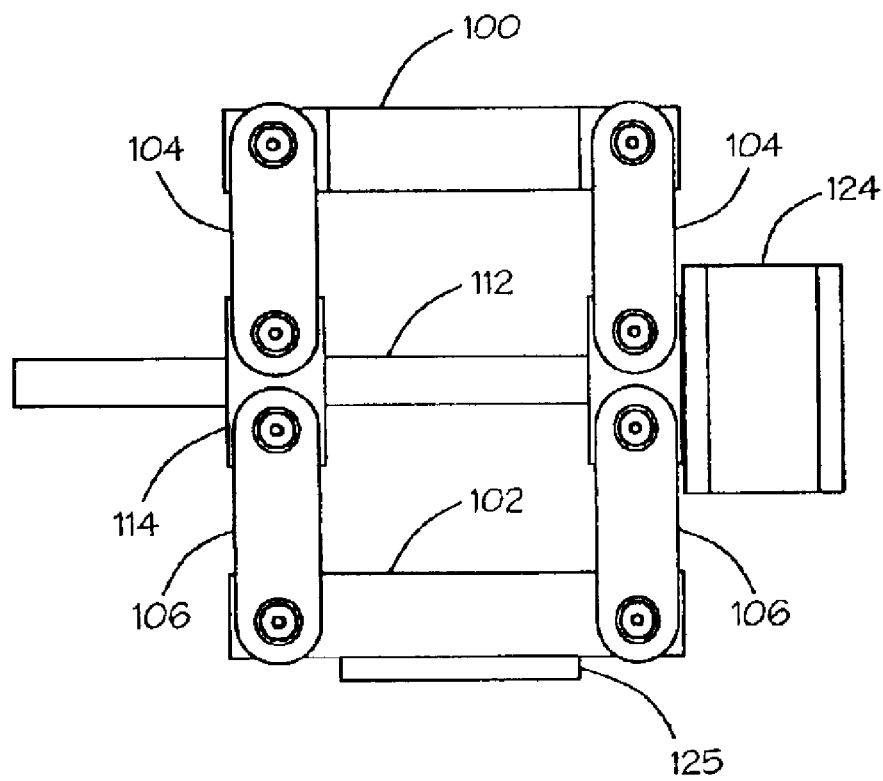

FIGS. 2A and 2B show an electric actuator according to the present invention. The actuator includes a first plate 100 and a second plate 102 that is substantially parallel to the first plate 100. A linkage system couples the first plate 100 to the second plate 102. The linkage system includes at least a first link 104 pivotally connected to a second link 106. It will be appreciated that the linkage system may be replicated one or more times to provide stability in the linkage between the first plate 100 and the second plate 102 and to increase the strength of the linkage system. If multiple linkage systems are used, all the linkage systems will function in unison and, for the purposes of this description, will be described as a single linkage system.

An electric motor 124 is coupled to a screw 112 such that the electric motor is capable of rotating the screw. The electric motor 124 and the screw 112 are coupled to the two links 104, 106 of the linkage system with the screw engaging a threaded block 114. Rotation of the screw 112 by the electric motor 124 may draw the pivot points which connect the first link 104 and the second link 106 toward an over-center position, where all the pivot points of the linkage system are co-linear. As the two links 104, 106 are moved toward the over-center position, the second plate 102 is moved away from the first plate 100, as may be seen in FIG. 2B.

Figure 3:
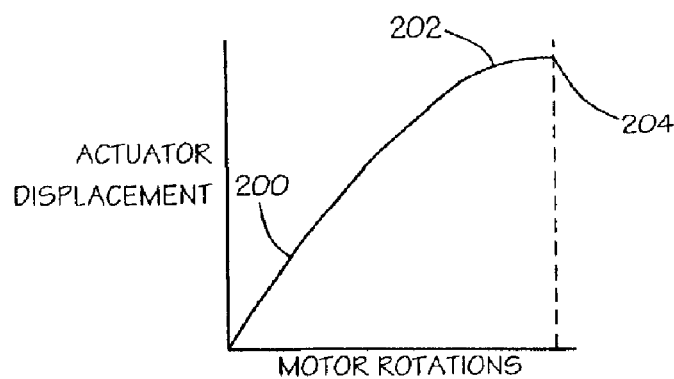
FIG. 3 is a graph of the relationship between motor rotations and actuator displacement.

FIG. 3 is a graph that shows the relationship between motor rotations and actuator displacement. When the linkage system is far from the over-center position as shown in FIG. 2A, the relationship between actuator displacement, the distance between the first plate 100 and the second plate 102, and motor rotations is approximately linear as may be seen in the portion of the curve in the vicinity of point 200. As the linkage system approaches the over-center position, as may be seen in FIG. 2B, the actuator displacement per motor revolution becomes less and less, as may be seen on the curve in the vicinity of point 202. At the over-center position, indicated at point 204, rotation of the motor does not change the actuator displacement. Generally it is desirable to operate the actuator so that the maximum required displacement occurs slightly before the over-center position.

It will be appreciated that the over-center effect of the linkage system gives the actuator a variable reduction ratio between the motor rotation and the actuator displacement. The initial displacement of the actuator occurs quickly as the motor rotates and then slows as the actuator approaches its maximum displacement and the over-center position. It will be further appreciated that this also has the effect of increasing the mechanical advantage between the motor and the actuator as the actuator approaches its maximum displacement. The motor 124 may be coupled to the screw 112 by means of a gear reduction or by other mechanical reduction means to further increase the mechanical advantage between the motor and the actuator.

The actuator further includes a force transducer, such a load cell 125, that produces a force signal responsive to the force produced by the actuator. A control system 21 (FIG. 1) receives the signal from the force transducer 125 and provides a control signal to the electric motor 124. The electric motor 124 may be a servo motor or a stepper motor that is capable of going to a particular position in response to the signal provided by the control system. A position sensor such as an encoder on the screw may provide a position signal to the controller. The control system 21 determines the stopping position for the electric motor 124 an actuator displacement based on the force signal (s) produced by the force transducer 125 in one or more previous movements of the linkage system. Thus, the control system 21 is able to accurately control the force produced by the actuator by controlling the stopping position of the electric motor 124 and thus the actuator displacement. The high mechanical advantage and high ratio between motor rotation and actuator displacement as the actuator approaches the desired displacement where the linkage system is near the over-center position, allows the control system to provide good accuracy and repeatability in the forces produced by the actuator.

Figure 1:
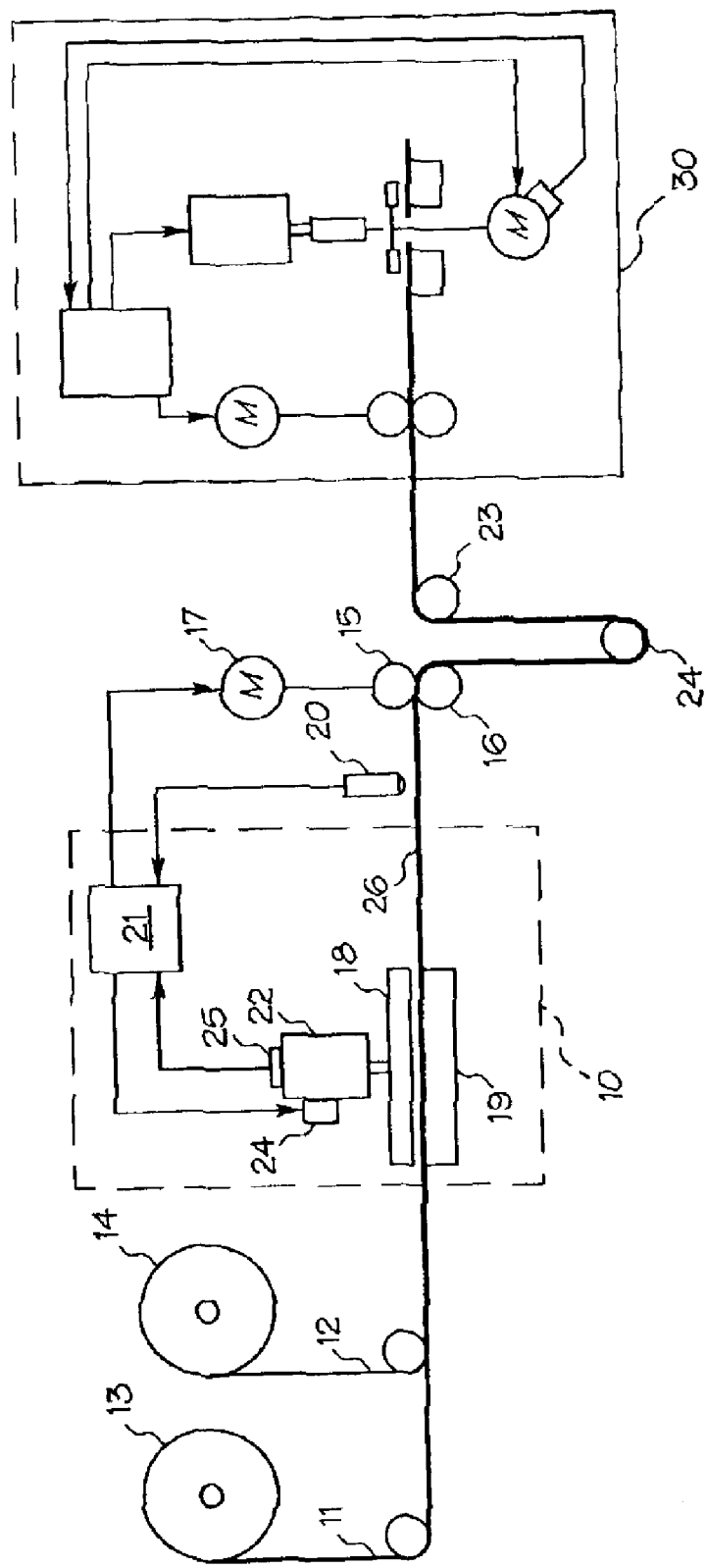
FIG. 1 is a schematic drawing of a pouch making machine.

The actuator may be applied to the heat-sealing station 10 of the pouch-making machine illustrated in FIG. 1. The heat-sealing station 10 includes an actuator 22, a force transducer 25, an electric motor 24, and a control system 21. The actuator 22 advances a heat-seal die 18 toward a platen 19 to create a heat seal between two plastic films 11, 12 to form a fused plastic web 26.

Figure 4:
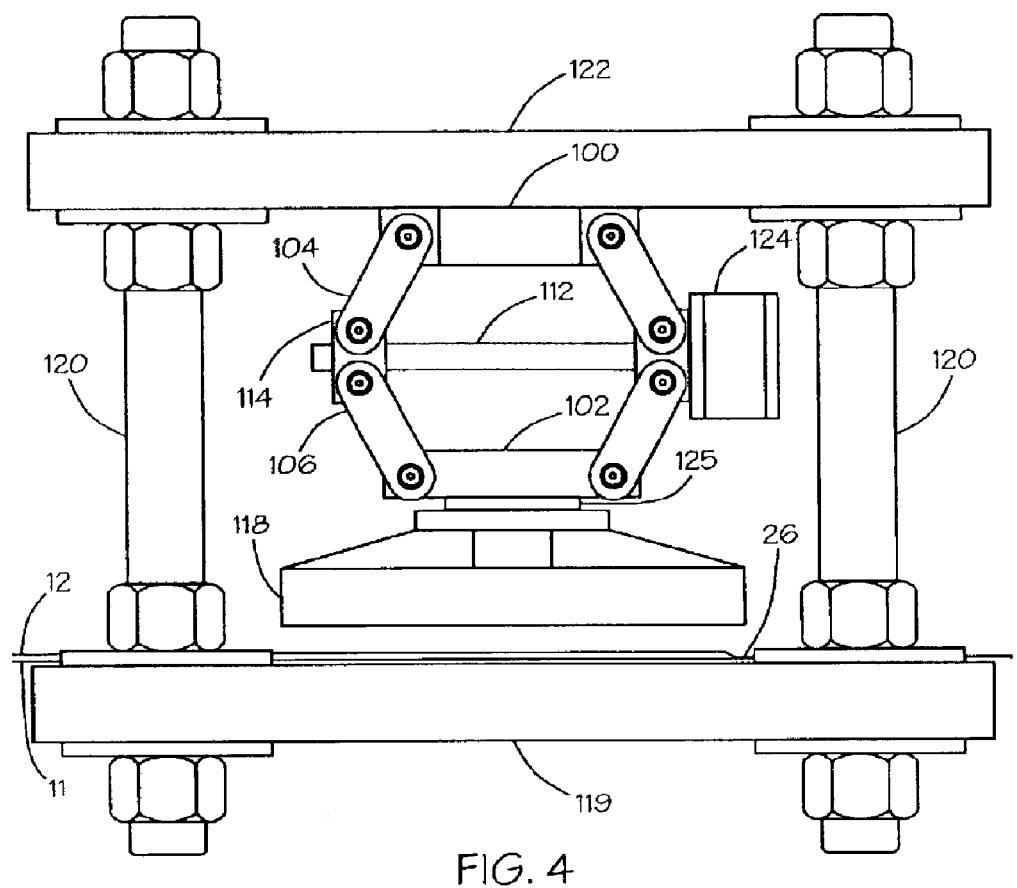
FIG. 4 is a side elevation of a heat sealing station using the actuator of FIGS. 2A and 2B.

FIG. 4 shows an exemplary configuration for a heat-seal station. In this embodiment the platen 119 is coupled to an actuator support 122 by a plurality of support columns 120. The first plate 100 of the actuator is coupled to the actuator support 122. The second plate 102 of the actuator is coupled to the heat-seal die 118. The force transducer 125 is interposed between the second plate 102 and the heat-seal die 118. The platen 119 may include a resilient surface, such as a rubber pad.

The control system 21 (FIG. 1) provides a control signal to the electric motor 124 causing the screw 112 to turn and move the two links 104, 106 of the linkage system toward the over-center position. As the linkage system approaches the over-center position, the heat-seal die 118 contacts the plastic films 11, 12 pressing them against the platen 119. It may be appreciated that the position where the heat seal die 118 will produce the required pressure varies over time as various parameters of the heat pealing station change. Examples of the changes that may affect the pressure produced by the heat seal die 118 include thermal expansion, wear, and variations in the thickness of the films being sealed.

The force transducer 125 produces a force signal responsive to the pressure being applied to the heat-seal die 118 by the actuator. The force required to produce a quality weld between the plastic films 11, 12 depends on the area of the seams being sealed The heat-seal die 118 may seal a number of products simultaneously and the seam area may be substantial. The force applied to the heat-seal die 118 may be 50,000 lbs. The heat-seal die 118 may be held against the plastic films 11, 12 for about one second to produce a quality weld. It is desirable that the heat-seal die 118 be raised above the plastic film by 1½ to 2 inches to avoid undue heating of the material that is below the heat-seal die between heat sealing operations. In this regard, the non-linear displacement of the actuator relative to the motor rotations is useful.

It will be appreciated that the working displacement of the actuator is desirably close to, although not at, the over-center position of the linkage system to maximize the force being generated. This also maximizes the ratio between motor rotations and actuator displacement which increases the accuracy of the control of actuator displacement at the working displacement and hence the accuracy of the force control. It may be desirable to provide an adjustment for the actuator position relative to the platen 119 so that the working displacement required from the actuator can be adjusted to occur near the over-center position.

It will be appreciated that it is desirable that the structure including the actuator provides a certain amount of compliance so that the force created by the actuator increases at a controlled rate when the heat seal die is in contact with the platen. It will be appreciated that the overcenter (toggle) device generates force when the heat seal die and the platen are in contact and natural compliance within the device members may allow for continued motion of the actuator and a controlled increase in force past the point where the heat seal die first makes contact with the platen. The platen 119 may include a resilient surface, such as a rubber pad which provides additional compliance. Other parts of the structure may allow resilient deformation to provide compliance.

Using the force signal from a previous actuator displacement cycle to determine the position for the following actuator displacement cycle may reduces the speed required from the control system to respond to the force signal. In many applications the cycle-to-cycle changes in force versus actuator displacement will be small and adjustment of the actuator displacement based on the force generated in the preceding cycle will be sufficient to control the force generated by the actuator. It has been found that the force can be controlled to within at least one percent of the target force using this mechanism.

In another embodiment, the controller 21 may be provided with predetermined values for force as a function of nominal motor position. The controller may find a first nominal motor position that corresponds to the measured force and a second nominal position that corresponds to the desired force. The controller may determine a corrected motor position to achieve the desired force by using the difference between the first and second nominal positions as a motor position correction in a subsequent movement of the linkage system.

Figure 5A:
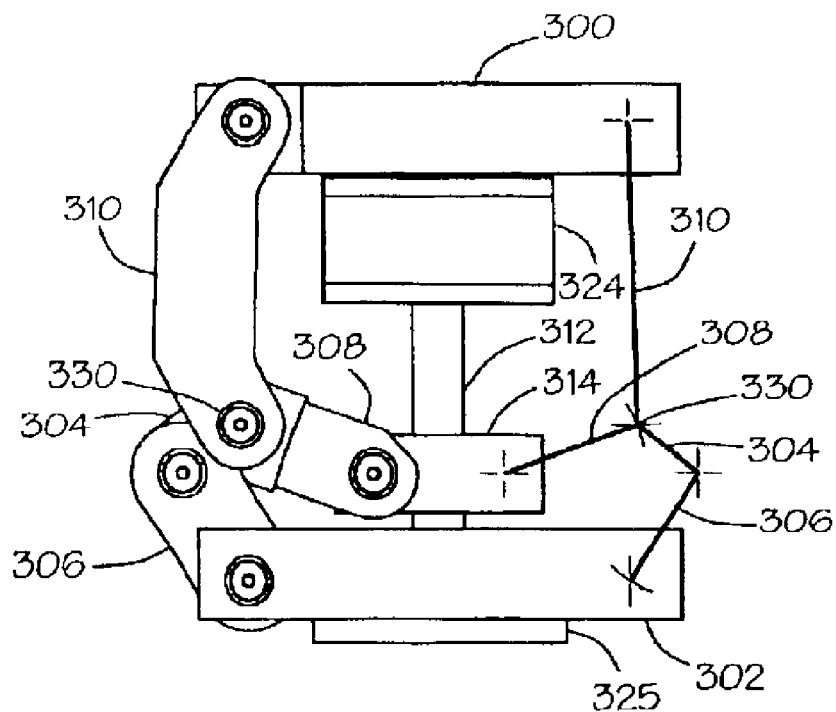
FIGS. 5A and 5B are side elevations of another embodiment of an electric actuator in two positions.
Figure 5B:
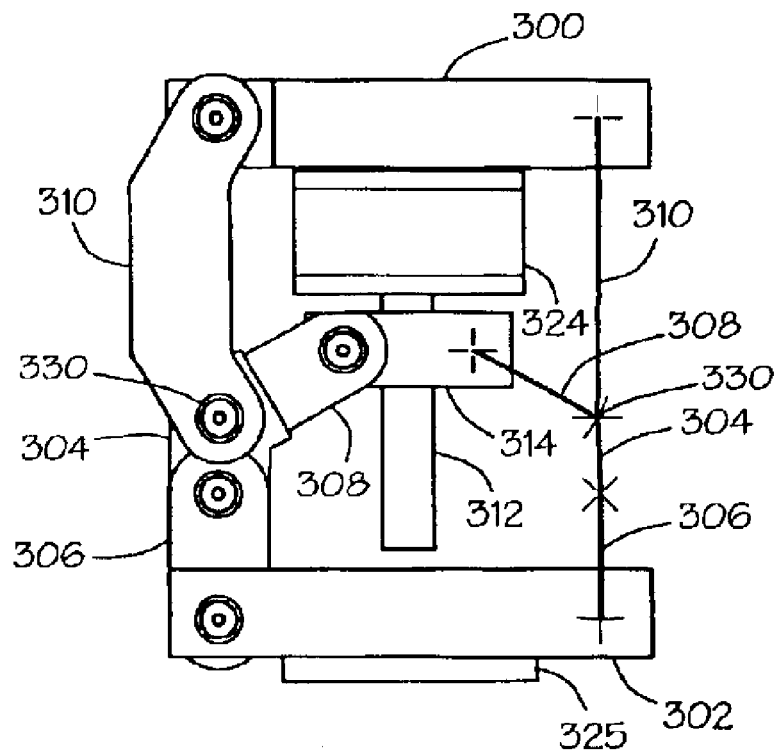

FIGS. 5A and 5B show another embodiment of an electric actuator according to the present invention. In these figures the links are shown schematically on the right side of the actuator to allow the mechanical arrangement of the links to be seen more clearly.

In this embodiment of the actuator a first plate 300 supports an electric motor 324 that is coupled to a screw 312 that is substantially perpendicular to the first plate. The electric motor may be directly coupled to the screw or coupled through a mechanical transmission that may provide a mechanical reduction of the motor rotation. A threaded block 314 engages the screw 312 such that the threaded block moves along the screw when the screw is rotated by the electric motor.

A first link 306 is pivotally connected to the second plate 302 at one end. A second link 304 is pivotally connected to the opposite end of the first link. A third link 310 is pivotally connected to the end of the second link opposite the end connected to the first link. The third link 310 is pivotally connected to the first plate 300 at the end opposite the end connected to the second link 304. A lever arm 308 is rigidly connected to the end of the second link 304 at the pivotal connection between the second link 304 and the third link 310. The outer end of the lever arm 308 is pivotally connected to the threaded block 314 such that movement of the threaded block causes the second link 304 to rotate and move the linkage system toward the over-center position.

The pivot point 330 where the lever arm 308 is joined to the second link 304 is coupled to the first plate 300 by the third link 310. The third link accommodates the movement required at pivot point 330 as the threaded block is moved by the rotation of the screw 312. As may be seen best in the schematic drawing of the links, at any given point along the screw 312, the threaded block 314 and the first plate 300 provide a fixed base between the pivot point on the threaded block 314 and the pivot point on the first plate 300. The lever arm 308 and the third link 310 form a triangle with the base created by the threaded block and first plate and thereby determine the location of the pivot point 330. As the threaded block is moved toward the first plate by rotation of the screw 312 the first link 306 and the second link 304 are moved toward the over-center position by the rotation of the lever arm 308. In this embodiment, the third link 310 remains close to the over-center position. The motion of the third link 310 may provide an additional force producing toggle action by moving toward the over-center position cooperatively with the first link 306 and the second link 304.

Figure 6:
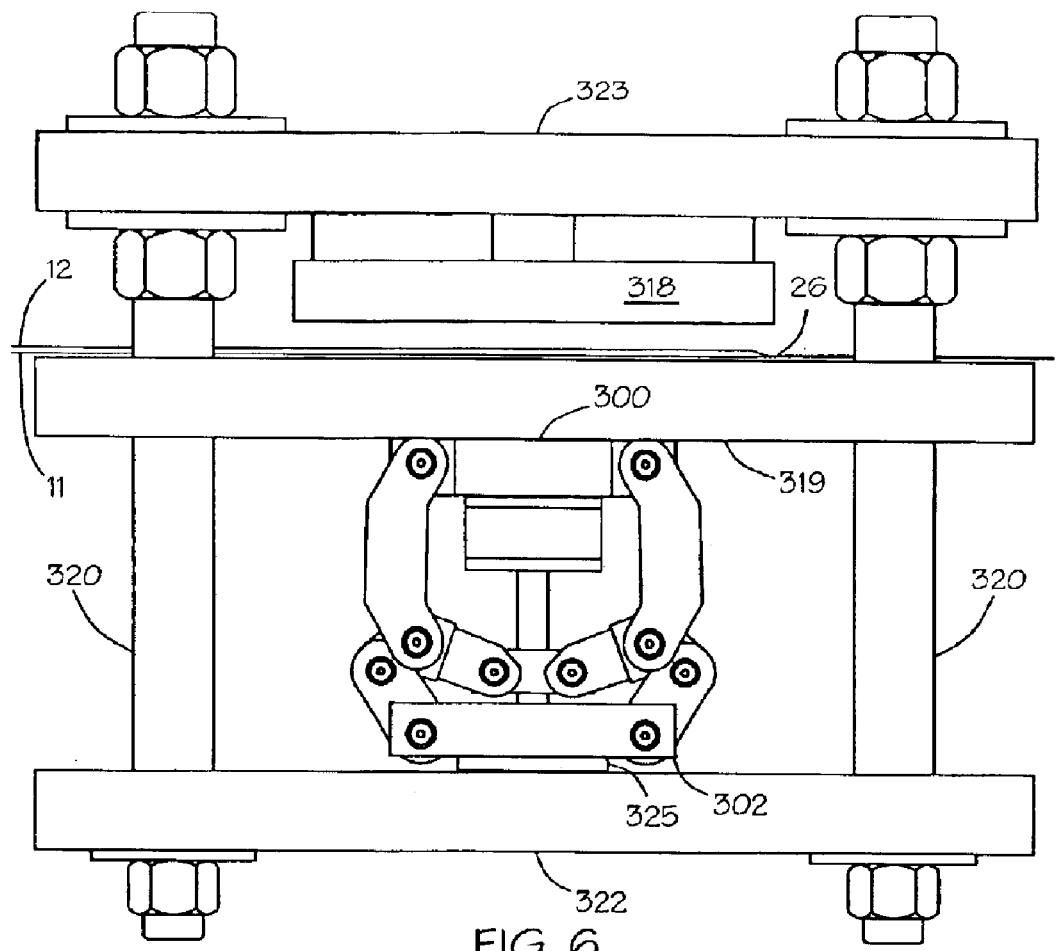
FIG. 6 is a side elevation of a heat sealing station using the actuator of FIGS. 5A and 5B.

FIG. 6 illustrates an embodiment of a heat-sealing station using an electric actuator with the second embodiment of the actuator. In this embodiment the first plate of the actuator 300 is attached to the platen 319 on the surface opposite the surface against which the heat-seal die 318 bears. As the linkage system moves towards the over-center position, the second plate 302 moves an actuator coupling plate 322 downward. A plurality of posts 320 are affixed to the actuator coupling plate 322 and pass upwardly through the platen 319. A die support plate 323 is coupled to the upper end of the posts 320. The die support plate 323 moves in unison with the actuator coupling plate 322. As the linkage system approaches the over-center position, the die support plate 323 presses the heat-seal die against the platen 319 to create a heat seal between the plastic films 11,12.

Figure 7:
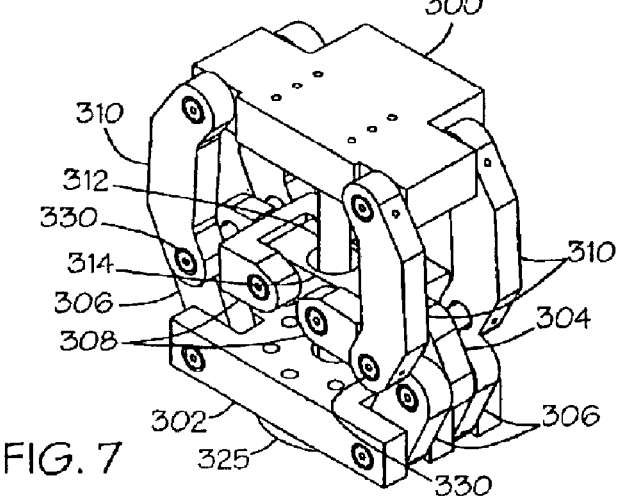
FIG. 7 is a pictorial view of the actuator of FIGS. 5A and 5B.

The structure of this embodiment, which places the actuator below the platen 319, may be advantageous in terms of providing greater access to the heat-seal die 318. As in the preceding embodiment, the position of the heat-seal die 318 may be adjusted so that the maximum actuator displacement occurs close to the over-center position. In this embodiment, the force transducers may be provided by a load cell 325 between the second plate 302 and the actuator support plate 322. In another embodiment, the force transducers may measure the tension in the coupling posts 320. FIG. 7 is a pictorial view of this embodiment of the actuator with the electric motor 324 omitted for clarity.

Figure 8:
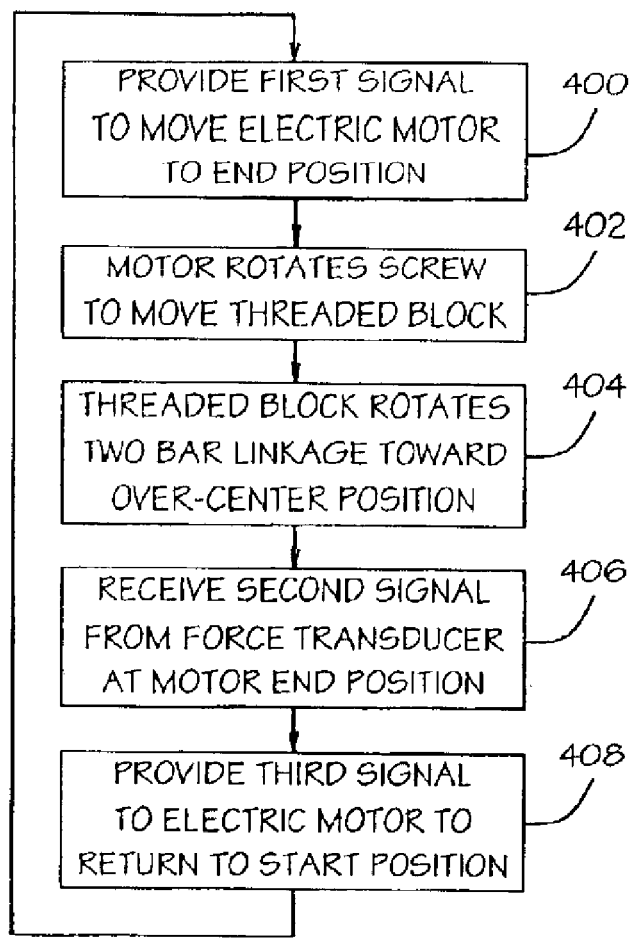
FIG. 8 is a flowchart of a method used by the controller for the electric actuator.

FIG. 8 is a flowchart of a method used by the controller 21 (FIG. 1) of a heat seal station to use the electric actuator of the present invention to produce a heat seal in a plastic film. The controller 21 moves the electric motor 24 from a start position to an end position 400 and back to the start position 408 in a repeating cycle. It will be appreciated that the end position for the electric motor may be a number of rotations in a given direction from a starting position. The displacement of the actuator is directly related to the position of the electric motor 24 as described above.

The controller 21 may provide a first signal to the electric motor 24 to move the linkage system of the actuator toward an over-center position by moving the electric motor to a first end position 400. The linkage system is coupled to the platen 19 and the heat seal die 18 such that moving the linkage system toward the over-center position causes the heat seal die to move toward the platen. The electric motor 24 may be a stepper motor or a servo motor. The electric motor 24 may include an encoder or resolver to sense to the position of the motor. The first signal may indicate the first end position at which the electric motor 24 should stop.

The electric motor 24 may rotate a screw coupled to the electric motor and to the linkage system to move the linkage system toward the over-center position 402. The electric motor 24 may rotate a third link by rotating the screw, the third link being pivotally connected to a threaded block that engages the screw. The third link may be rigidly connected to one link of the linkage system at a pivot point such that rotation of the third link causes the one link to rotate and move the linkage system toward the over-center position 404.

The controller 21 receives a second signal from a force transducer 2S coupled to the actuator when the motor reaches the first end position 406. The second signal is responsive to a force produced by the actuator. The controller 21 may terminate the first signal to stop the linkage system at the first end position, the first end position being determined in response to the second signal. The first end position may be immediately determined by the second signal or determined by the second signal in a previous movement of the actuator. The first end position is thereby controlled to produce a desired force responsive to the second signal.

Figure 9:
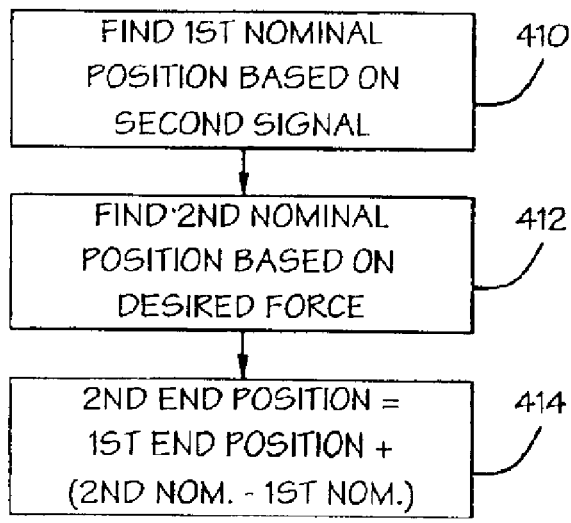
FIG. 9 is a flowchart of a method used by the controller to determine an end position for the electric motor.

The controller 21 may determine a second end position for a subsequent movement of the linkage system as a correction to the first end position in a previous movement of the linkage system responsive to a difference between a desired force and the force generated by the actuator at the end position. FIG. 9 is a flowchart of a method the controller 21 may use to determine the second position. The controller 21 may be provided with predetermined values for force as a function of motor position.

The controller 21 may use the predetermined force-position function to compute a first nominal motor position that corresponds to the force represented by the second signal 410 and a second nominal motor position that corresponds to a desired force 412. The positions computed are nominal in that they are positions based on the predetermined force-position function rather than the positions that may actually be required to produce the forces. The controller 21 may determine the second end position for a subsequent movement of the linkage system as a correction to the first end position in a previous movement of the linkage system based on a difference between the first and second nominal motor positions 414. The difference between the first and second nominal motor positions provides a good estimate of the position correction required to produce the desired force. Applying the position correction to the actual position that produced the measured force provides a good estimate for an actual position that will produce the desired force.

Figure 10:
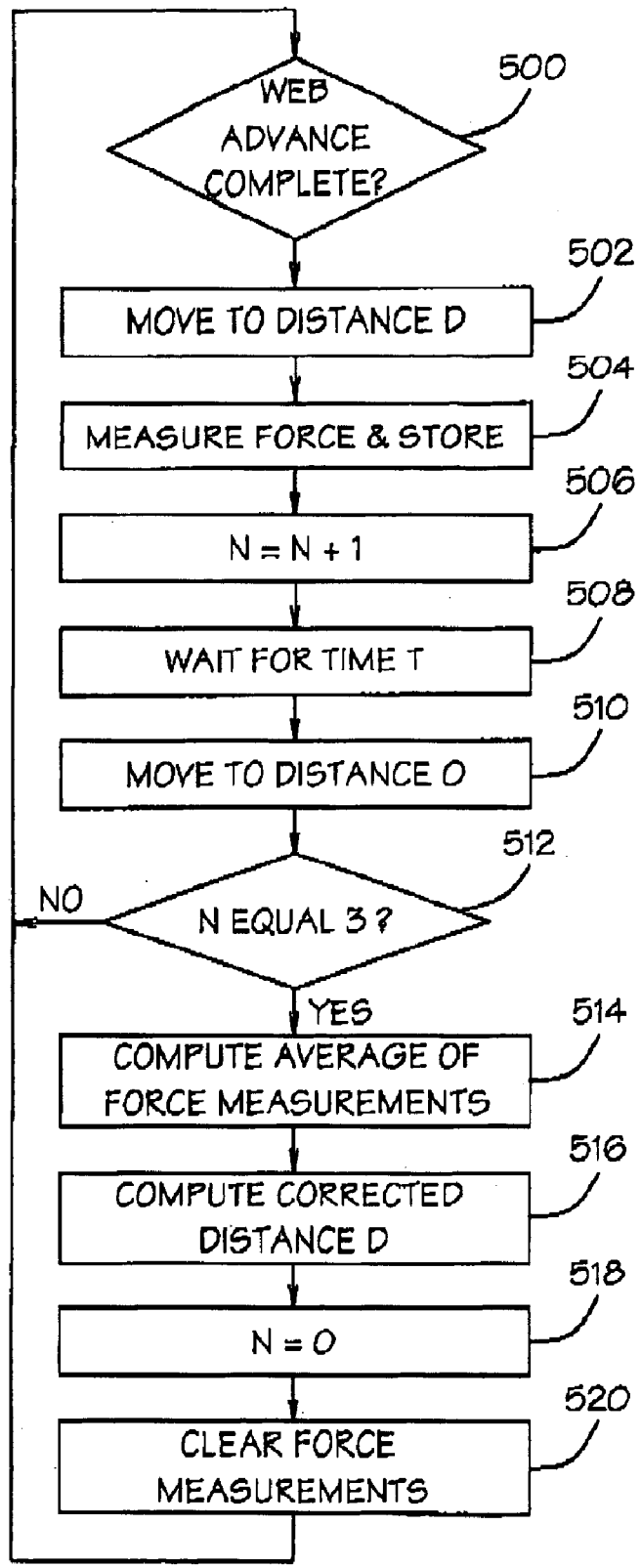
FIG. 10 a flowchart of a method for producing a heat seal in plastic films that may be used by an embodiment of the controller.

FIG. 10 is a flowchart for a method for producing a heat seal in plastic films 11, 12 that may be used by an embodiment of the controller 21. The heat seal die 18 may be moved toward the platen 19 for a number of cycles, such as three cycles, after which the controller 21 makes an adjustment to the distance the heat seal die is moved.

Each movement cycle begins when the webs of plastic material 11, 12 have advanced a predetermined amount 500 and with the heat seal die 18 at a retracted starting position, which will be termed distance 0. The controller 21 provides a first signal to move an electric motor 24 to an end position, which will be termed distance D 502. This moves a linkage system toward an over-center position. The linkage system is coupled to the platen and the heat seal die such that moving the linkage system toward the over-center position causes the heat seal die to move toward the platen.

It will be appreciated that the webs of plastic material 11, 12 must be stopped when the heat seal die 18 comes into contact with the plastic material. In one embodiment of the method, the stopping of the webs will substantially coincide with the start of the first signal to move the electric motor 24 to the end position. However, it will be appreciated that the entire motion of the heat seal die 18 is controlled. This permits another embodiment of the method wherein the start of the first signal to move the electric motor 24 to the end position occurs when the webs have advanced to a predetermined position that substantially precedes the position at which the webs will stop. The predetermined position is chosen such that the webs stop just shortly before the heat seal die makes contact with the webs. This will reduce the length of the heat seal cycle by a large portion of the time it takes to move the heat seal die into contact with the webs.

The controller 21 receives a second signal from a force transducer 25 coupled to the actuator 22 when the electric motor 24 is at the first end position. The second signal is representative of a force then being produced by the actuator. A force value as measured by the second signal is stored by the controller 504. The controller stores a number of force values, each force value stored corresponding to the force produced by the actuator for a movement of the heat seal die. The controller maintains a count of the cycles 506. After holding the heat seal die against the plastic films for a suitable period of time T 508, the controller retracts the heat seal die to the starting position, distance 0 510. The webs of plastic material 11, 12 may be advanced to begin another cycle.

When the controller 21 has completed a predetermined number of cycles, such as three cycles, the controller corrects the distance D before starting the next movement of the heat seal die 512. The controller computes a representative force value from the several stored force values 514. The representative force value may be the average of the several force values. The controller then computes a corrected end position based on a difference between the representative force value and a desired force value 516. The controller may maintain a representative function for change of force versus change of end position. The representative function may be in the form of a table of empirical values.

The controller may find a first nominal end position using the representative function and the representative force value. The controller may then find a second nominal end position using the representative function and the desired force value. A correction value may then be determined as the difference between the first and second nominal values. The correction value may be applied to the end position D to compute the corrected distance D. In one embodiment, the controller does not correct the end position if the correction value is less than a predetermined value.

After computing the corrected distance D, the controller clears the cycle count 518 and clears the stored force values 520. The entire cycle of repeated movements followed by correction of the movement distance is then repeated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electric actuator comprising:

a first plate;

a second plate substantially parallel to the first plate;

a linkage system that couples the first plate to the second plate such that moving the linkage system toward an over-center position causes the second plate to move away from the first plate;

an electric motor coupled to the linkage system, the electric motor capable of moving the linkage system toward the over-center position;

a force transducer coupled to the actuator, the force transducer capable of producing a force signal responsive to a force produced by the actuator;

a control system coupled to the electric motor and the force transducer, the control system capable of providing a control signal to the electric motor to move the linkage system to a position, the position having been determined by the control system in response to the force signal in a previous movement of the linkage system.

2. The electric actuator of claim 1, further including a screw coupled to the electric motor and to the linkage system, the electric motor capable of rotating the screw to move the linkage system.

3. The electric actuator of claim 2, further comprising a threaded block that engages the screw such that the threaded block moves along the screw when the screw is rotated by the electric motor, the threaded block being coupled to the linkage system such that the linkage system moves toward the over-center position as the threaded block moves along the screw.

4. The electric actuator of claim 3, wherein the linkage system further comprises:
 a first link having a first end and an opposing second end, the first end pivotally connected to the second plate; and
 a second link having a third end and an opposing fourth end, the third end pivotally connected to the second end of the first link.

5. The electric actuator of claim 4, wherein the linkage system further comprises:
 a third link having a fifth end and an opposing sixth end, the fifth end pivotally connected to the fourth end of the second link, the sixth pivotally connected to the first plate; and
 a lever arm rigidly connected to the fourth end of the second link and pivotally connected to the threaded block such that movement of the threaded block causes the one link to rotate and move the linkage system toward the over-center position.

6. The electric actuator of claim 1, wherein the position determined by the control system is determined from a plurality of previous movements of the linkage system.

7. The electric actuator of claim 6, wherein the plurality of previous movements is three movements.

8. The electric actuator of claim 6, wherein the force signal is the average of a plurality of forces produced during the plurality of previous movements.

9. The electric actuator of claim 6, wherein the position is further responsive to a representative function for change of force versus change of end position.

10. The electric actuator of claim 1, wherein the electric motor is a servo motor.

11. The electric actuator of claim 1, wherein the electric motor is a stepper motor.

12. A heat seal station for heat sealing a plastic film comprising:
 a platen;
 a heat seal die;
 an electric actuator having a first end coupled to the platen and an opposing second end coupled to the heat seal die;
 a linkage system that couples the first end of the actuator to the second end such that moving the linkage system toward an over-center position causes the heat seal die to move toward the platen;
 an electric motor coupled to the linkage system, the electric motor capable of moving the linkage system toward the over-center position;
 a force transducer coupled to the actuator, the force transducer capable of producing a force signal responsive to a force produced by the actuator;
 a control system coupled to the electric motor and the force transducer, the control system capable of providing a control signal to the electric motor to move the linkage system to a position, the position having been determined by the control system in response to the force signal in a previous movement of the linkage system.

13. The heat seal station of claim 12, further including a screw coupled to the electric motor and to the linkage system, the electric motor capable of rotating the screw to move the linkage system.

14. The heat seal station of claim 13, further comprising a threaded block that engages the screw such that the threaded block moves along the screw when the screw is rotated by the electric motor, the threaded block being coupled to the linkage system such that the linkage system moves toward the over-center position as the threaded block moves along the screw.

15. The heat seal station of claim 14, further comprising:
 a first link having a first end and an opposing second end, the first end pivotally connected to the heat seal die; and
 a second link having a third end and an opposing fourth end, the third end pivotally connected to the second end of the first link.

16. The heat seal station of claim 15, further comprising:
 a third link having a fifth end and an opposing sixth end, the fifth end pivotally connected to the fourth end of the second link, the sixth pivotally connected to the platen; and
 a lever arm rigidly connected to the fourth end of the second link and pivotally connected to the threaded block such that movement of the threaded block causes the one link to rotate and move the linkage system toward the over-center position.

17. The electric actuator of claim 12, wherein the position determined by the control system is determined after a plurality of previous movements of the linkage system.

18. The electric actuator of claim 17, wherein the plurality of previous movements is three movements.

19. The electric actuator of claim 17, wherein the force signal is the average of a plurality of forces produced during the plurality of previous movements.

20. The electric actuator of claim 17, wherein the position is further responsive to a representative function for change of force versus change of end position.

21. The heat seal station of claim 12, wherein the electric motor is a servo motor.

22. The heat seal station of claim 12, wherein the electric motor is a stepper motor.

23. A method for producing a heat seal in a plastic film comprising:
 providing a first signal to move an electric motor to a end position and thereby move a linkage system toward an over-center position, the linkage system being coupled to a platen and a heat seal die such that moving the linkage system toward the over-center position causes the heat seal die to move toward the platen; and
 receiving a second signal from a force transducer coupled to the actuator when the electric motor is at the end position, the second signal responsive to a force produced by the actuator;
 wherein the end position is controlled to produce a desired force responsive to the second signal in a previous movement of the linkage system.

24. The method for producing a heat seal of claim 23, further comprising rotating a screw coupled to the electric motor and to the linkage system to move the linkage system.

25. The method for producing a heat seal of claim 24, further comprising rotating a lever arm by rotating the screw, the lever arm being pivotally connected to a threaded block that engages the screw, the lever arm being rigidly connected to one link of the linkage system at a pivot point such that rotation of the lever arm causes the one link to rotate and move the linkage system toward the over-center position.

26. The method for producing a heat seal of claim 23, wherein the first signal is a signal for a servo motor.

27. The method for producing a heat seal of claim 23, wherein the first signal is a signal for a stepper motor.

28. The method for producing a heat seal of claim 23, further comprising receiving a third signal when the plastic film has advanced to a predetermined position, the third signal indicating that the first signal should be provided, the predetermined position being such that the plastic film will be stopped before the heat seal die comes into contact with the plastic film.

29. A method for producing a heat seal in a plastic film comprising:

moving a heat seal die toward a platen a plurality of times by providing a first signal to move an electric motor to an end position and thereby move a linkage system toward an over-center position, the linkage system being coupled to the platen and the heat seal die such that moving the linkage system toward the over-center position causes the heat seal die to move toward the platen, and receiving a second signal from a force transducer coupled to the actuator when the electric motor is at the end position, the second signal responsive to a force produced by the actuator;

storing a plurality of force values, each force value corresponding to the force produced by the actuator for one of the plurality of movements of the heat seal die;

computing a representative force value from the stored plurality of force values; and computing a corrected end position responsive to a difference between the representative force value and a desired force value.

30. The method for producing a heat seal of claim 29, wherein the plurality of movements is three movements.

31. The method for producing a heat seal of claim 29, wherein computing the representative force value further comprises computing the average of the plurality of force values.

32. The method for producing a heat seal of claim 29, wherein computing the corrected end position is further responsive to a representative function for change of force versus change of end position.

* * * * *